(12) United States Patent
Sato et al.

(10) Patent No.: US 10,814,416 B2
(45) Date of Patent: Oct. 27, 2020

(54) METHOD FOR PRODUCING THREADED SHAFT FOR POWER STEERING DEVICE, AND POWER STEERING DEVICE

(71) Applicant: HITACHI AUTOMOTIVE SYSTEMS, LTD., Hitachinaka-shi, Ibaraki (JP)

(72) Inventors: Atsushi Sato, Yokote (JP); Keisuke Kitamura, Atsugi (JP); Mitsuaki Abe, Yokote (JP); Tetsuya Yonezawa, Yokote (JP); Tatsuyoshi Maruyama, Atsugi (JP); Osamu Yoshida, Yokohama (JP); Kenji Kagami, Machida (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 344 days.

(21) Appl. No.: 15/763,603

(22) PCT Filed: Sep. 26, 2016

(86) PCT No.: PCT/JP2016/078248
§ 371 (c)(1),
(2) Date: Mar. 27, 2018

(87) PCT Pub. No.: WO2017/057264
PCT Pub. Date: Apr. 6, 2017

(65) Prior Publication Data
US 2018/0272448 A1   Sep. 27, 2018

(30) Foreign Application Priority Data

Oct. 2, 2015   (JP) .................................. 2015-196423

(51) Int. Cl.
*B24B 19/02*   (2006.01)
*B23G 1/38*   (2006.01)
(Continued)

(52) U.S. Cl.
CPC ................ *B23G 1/38* (2013.01); *B24B 19/02* (2013.01); *B62D 5/0445* (2013.01);
(Continued)

(58) Field of Classification Search
CPC ........ B24B 19/02; B23G 1/38; B62D 5/0445; B62D 5/0448; F16H 25/22;
(Continued)

(56) References Cited

U.S. PATENT DOCUMENTS

| | | | | |
|---|---|---|---|---|
| 1,660,890 A | * | 2/1928 | Schramm | B24B 3/12 451/127 |
| 1,702,160 A | * | 2/1929 | Hanson | B24B 19/022 451/47 |
| 2,409,993 A | * | 10/1946 | Stupakoff | B28B 11/0854 408/217 |
| 2,420,504 A | * | 5/1947 | Gilbert | B24B 19/022 451/65 |

(Continued)

FOREIGN PATENT DOCUMENTS

| | | |
|---|---|---|
| JP | 2009-172694 A | 8/2009 |
| JP | 2010-099802 A | 5/2010 |
| JP | 2016-055416 A | 4/2016 |

*Primary Examiner* — George B Nguyen
(74) *Attorney, Agent, or Firm* — Foley & Lardner LLP

(57) ABSTRACT

In a power steering device equipped with a rack shaft constructed by joining a first member having rack teeth and a second member serving as a ball screw shaft on which a ball screw groove is formed, a grinding process of the ball screw groove is performed on the second member by causing a grindstone to rotate and move along a rotation axis of the second member, while causing the second member to rotate about an axis of the second member as the rotation axis. The grinding process is performed so as to satisfy a specified machining condition "g/(5×p)<w<g/p", where w is a rotational speed of the second member during grinding of the ball screw groove, g is a rotational speed of the grindstone during grinding of the ball screw groove, and p is a circumferential length of one circumference of the ball screw groove around the rotation axis.

6 Claims, 7 Drawing Sheets

(51) Int. Cl.
*B62D 5/04* (2006.01)
*F16H 25/22* (2006.01)
*F16H 25/24* (2006.01)
*F16H 25/20* (2006.01)

(52) U.S. Cl.
CPC ........... B62D 5/0448 (2013.01); F16H 25/22 (2013.01); F16H 25/2204 (2013.01); F16H 25/24 (2013.01); *F16H 2025/2081* (2013.01); *F16H 2025/2096* (2013.01); *F16H 2025/2481* (2013.01)

(58) Field of Classification Search
CPC ................. F16H 25/2204; F16H 25/24; F16H 2025/2081; F16H 2025/2096; F16H 2025/2481
USPC ........................................................ 451/222
See application file for complete search history.

(56) References Cited

U.S. PATENT DOCUMENTS

| | | | | |
|---|---|---|---|---|
| 4,548,000 | A | * | 10/1985 | Junker ...................... B24B 3/18 451/222 |
| 4,930,265 | A | | 6/1990 | Belthle |
| 4,953,325 | A | * | 9/1990 | Unser ...................... B23G 1/38 451/14 |
| 9,327,758 | B2 | * | 5/2016 | Watanabe ............ B62D 5/0448 |
| 9,579,737 | B1 | * | 2/2017 | Tenebria .................. B23G 1/38 |
| 9,814,487 | B2 | * | 11/2017 | Iwase ................. A61B 10/0233 |
| 2011/0097971 | A1 | * | 4/2011 | Kumeno ................. B24B 51/00 451/5 |
| 2012/0129433 | A1 | * | 5/2012 | Makiuchi ............... B24B 49/16 451/5 |
| 2015/0060188 | A1 | * | 3/2015 | Kitamura ................ B21K 1/64 180/444 |

* cited by examiner

METHOD FOR PRODUCING THREADED SHAFT FOR POWER STEERING DEVICE, AND POWER STEERING DEVICE

TECHNICAL FIELD

The present invention relates to a method for producing a threaded shaft for power steering device, which is applied to an automotive power steering device.

BACKGROUND ART

As a prior-art method for producing a threaded shaft for power steering device, for instance, a threaded shaft producing method as disclosed in the following Patent document 1 is generally known.

In the above-mentioned threaded shaft producing method for power steering device, in grinding the threaded shaft, a grinding apparatus, which is equipped with a lower rest shoe for supporting a spiral groove surface of the threaded shaft in contact therewith from below the spiral groove surface and a rear rest shoe for supporting the spiral groove surface in contact therewith from the opposite side of a grindstone, is used. A grinding process is performed, while supporting the threaded shaft from two different directions by means of the grinding apparatus. By virtue of the previously-noted support from two directions, it is possible to counteract a working resistance complicatedly varying during the grinding process as well as a force acting in another direction due to the dead weight of a work (a workpiece). This contributes to the suppression of a waviness "WAVINESS", which is a periodic change of the groove radius of the spiral groove based on a runout (a tooth space runout) and a deflection of the work generated during grinding.

CITATION LIST

Patent Literature

Patent document 1: Japanese patent provisional publication No. JP2010-099802 A

SUMMARY OF INVENTION

Technical Problem

However, as discussed above, the prior-art threaded shaft producing method for power steering device is based on the support from two directions. In contrast, in the case of the support from only one direction, it is necessary to suppress the speed difference between a rotational speed of the grindstone and a rotational speed of the work, the speed difference being one factor of causes of generation of the previously-discussed "WAVINESS".

In this case, the rotational speed of the grindstone is naturally limited by machining or working conditions (grinding conditions). On the other hand, assuming that the rotational speed of the work is too close to the rotational speed of the grindstone, a working required time (hereinafter referred to as "cycle time") becomes too long. This leads to the problem such as an increase in threaded shaft production costs.

It is, therefore, in view of the previously-described drawbacks of the prior art, an object of the invention to provide a method for producing a threaded shaft for power steering device, and a power steering device, capable of achieving both of the quality improvement and the suppression of a working time increase.

Solution to Problem

In order to accomplish the aforementioned and other objects, according to the present invention, there is provided a method for producing a threaded shaft for power steering device, the threaded shaft being formed such that a groove radius, which is a distance from a rotation axis of a ball screw shaft to a shaft-side ball screw groove, periodically changes in a circumferential direction of the rotation axis, the method comprising a first step of causing the ball screw shaft to rotate about an axis of the ball screw shaft as a rotation axis, and a second step of grinding the ball screw shaft by causing a grindstone to rotate and move along the rotation axis of the ball screw shaft while performing the first step, characterized by the first step and the second step being performed so as to satisfy an expression (an inequality) $g/(5 \times p) < w < g/p$, where w is a rotational speed of the ball screw shaft during grinding of the shaft-side ball screw groove, g is a rotational speed of the grindstone during grinding of the shaft-side ball screw groove, and p is a circumferential length of one circumference of the shaft-side ball screw groove around the rotation axis.

Advantageous Effects of Invention

According to the invention, it is possible to suppress the extension of cycle time required for machining a shaft-side ball screw groove, while ensuring a good surface accuracy of the shaft-side ball screw groove.

Especially, satisfying the inequality "$w < g/p$" enables good superfinishing after the shaft-side ball screw groove has been ground. Additionally, satisfying the inequality "$g/(5 \times p) < w$" suppresses the cycle time required for grinding the shaft-side ball screw groove from being extended more than needed.

BRIEF DESCRIPTION OF DRAWINGS

FIG. 3*a* is a diagram illustrating the state of "WAVINESS" of 200 Hz after grinding and the state of "WAVINESS" after superfinishing, whereas

DESCRIPTION OF EMBODIMENTS

Embodiments of a method for producing a threaded shaft for power steering device and a power steering device according to the present invention are hereinafter described in detail with reference to the accompanying drawings. By the way, in the embodiments shown hereunder, the method for producing the threaded shaft for power steering device is exemplified in an automotive power steering device.

Figure 1:
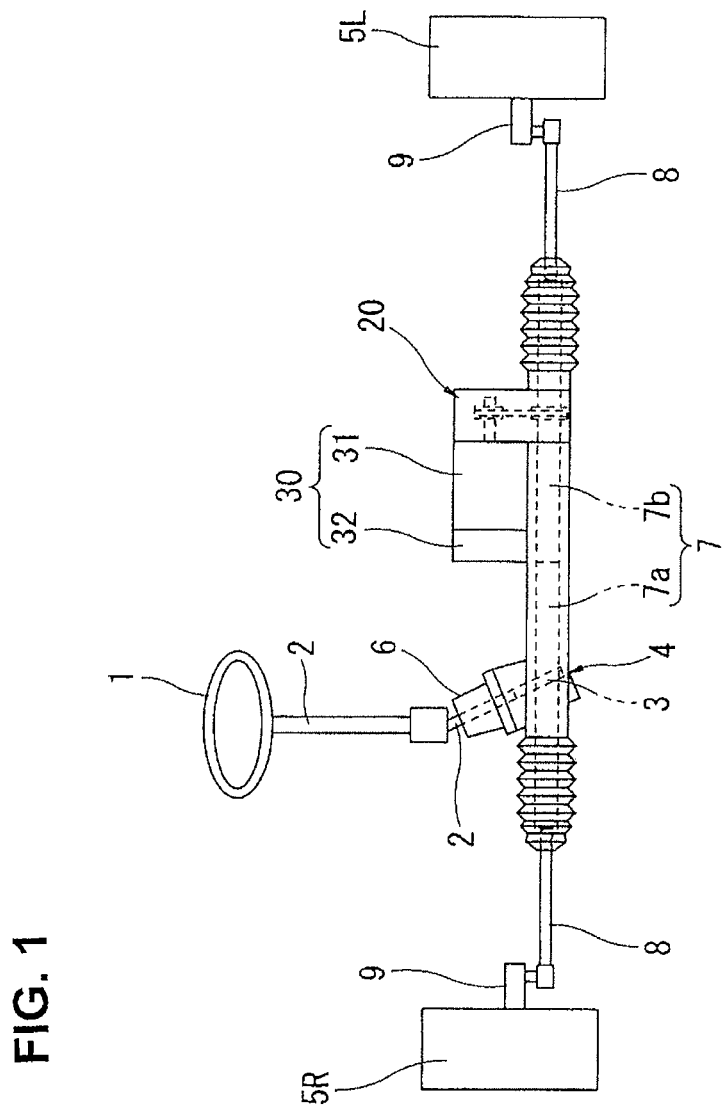
FIG. 1 is a schematic diagram illustrating a power steering device to which the invention is applied.
Figure 2:
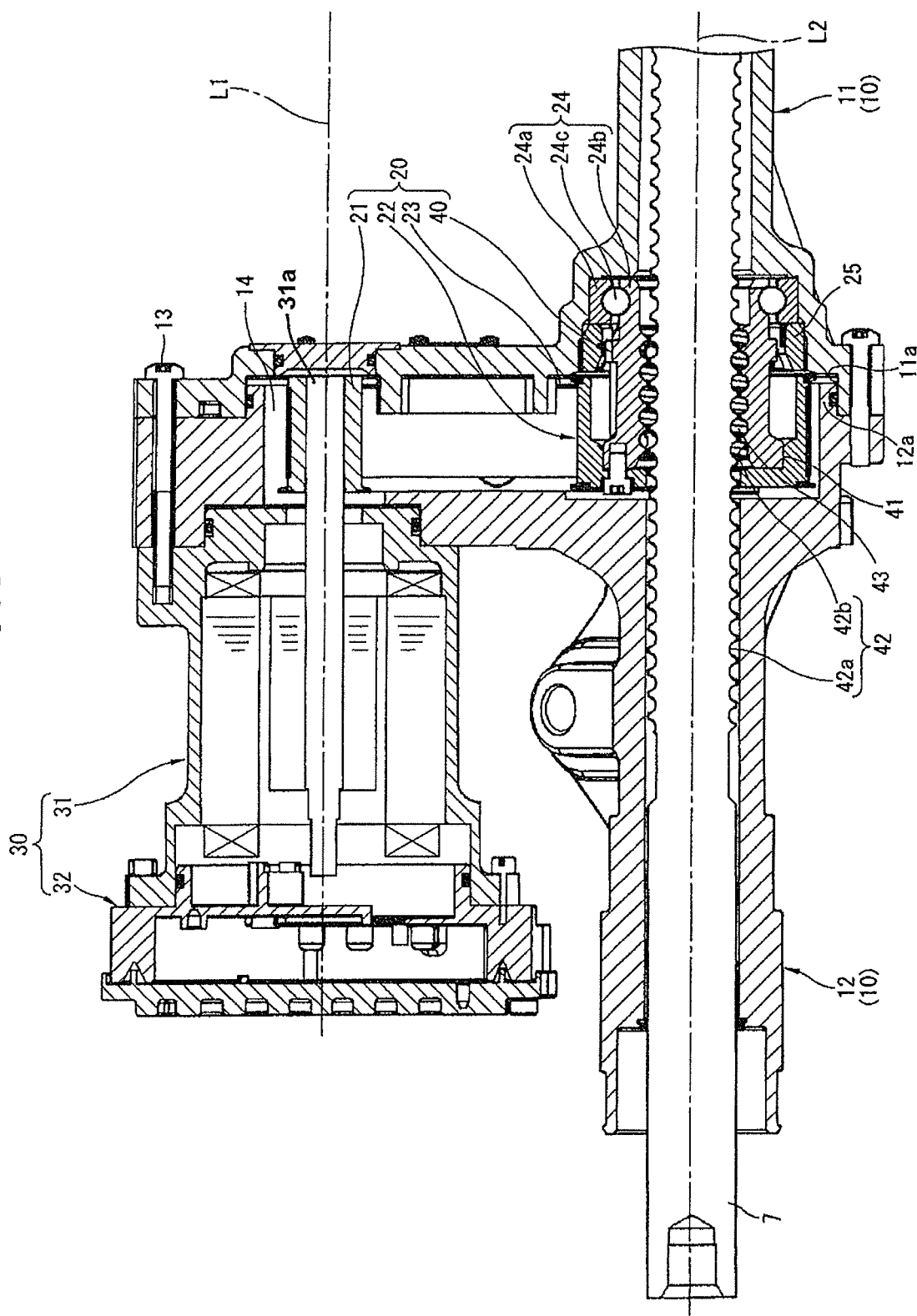
FIG. 2 is an enlarged sectional view illustrating the vicinity of a transfer mechanism shown in FIG. 1.

FIG. 1 is a schematic diagram illustrating the system configuration of the power steering device, whereas FIG. 2 is a sectional view along the axial direction of a rack shaft near and around a transfer mechanism (a motion transfer mechanism).

As shown in FIG. 1, the power steering device is mainly comprised of an input shaft 2, an output shaft 3, a motor unit 30, and the transfer mechanism 20. One axial end of input shaft 2 is linked to a steering wheel 1 for co-rotation with the steering wheel. One axial end of output shaft 3 is linked to the other end of input shaft 2 through a torsion bar (not shown) so as to be rotatable relative to the input shaft. The other end of output shaft 3 is linked to steered road wheels 5L, 5R through a rack-and-pinion mechanism 4. The motor unit 30 is configured to apply a steering assist torque, which is determined according to the driver's steering torque and also based on detection results of various sensors, such as a torque sensor 6 installed on the outer peripheral side of the input shaft 2 for detecting steering torque based on a relative rotational displacement between the input shaft 2 and the output shaft 3, a vehicle speed sensor (not shown) and the like, to a rack shaft 7 (described later). The transfer mechanism 20 is configured to reduce output rotation (in other words, to increase the rotational force) of motor unit 30 and motion-transfer to the rack shaft 7, while converting the speed-reduced rotation to axial movement (axial moving force) of the rack shaft.

Rack-and-pinion mechanism 4 is comprised of a pinion gear (not shown) formed on the outer periphery of the axial end of output shaft 3 and a rack gear (not shown) in mesh with the pinion gear and formed in a prescribed axial range of the rack shaft 7 arranged substantially perpendicularly to the same axial end of output shaft 3. The rack-and-pinion mechanism is configured such that the rack shaft 7 axially moves depending on the rotational direction of output shaft 3. Both ends of rack shaft 7 are linked through tie rods 8 and knuckle arms 9 to left and right steered road wheels 5L, 5R, respectively. When the rack shaft 7 moves in an axial direction, the knuckle arms 9 are pulled via the respective tie rods 8, thereby causing the direction of each of steered road wheels 5L, 5R to be changed.

As shown in FIGS. 1-2, in particular, rack shaft 7 is constructed by joining a first member 7a and a second member 7b. The first member has rack teeth (not shown) formed on its outer periphery and constructs the previously-discussed rack-and-pinion mechanism 4. The second member has a shaft-side ball screw groove 42a (described later) formed in its outer periphery and constructs a ball screw 40 (described later). The rack shaft 7 is arranged in a housing 10 in a manner so as to be movable along its axial direction. The housing 10 is comprised of a first housing 11 (one-end side housing) for accommodating therein the rack-and-pinion mechanism 4 and a second housing 12 (the other-end side housing) for accommodating therein the transfer mechanism 20. The first housing and the second housing are integrally connected to each other.

By the way, the first housing 11 and the second housing 12 are integrally connected to the motor unit 30 by fastening them together with a plurality of bolts 13 (e.g., three bolts in the shown embodiment) for fastening the housing 10 and the motor unit 30, while performing positioning on respective axes L1, L2 (described later) by fitted-engagement between a convex portion 12a and a concave portion 11a. The convex portion 12a is configured to protrude from the joint end of the second housing 12, whereas the concave portion 11a is recessed in the joint end of the first housing 11.

As shown in FIG. 2, transfer mechanism 20 is mainly comprised of an input-side pulley 21, an output-side pulley 22, the ball screw 40, and a belt 23. The input-side pulley 21 is provided on the outer periphery of the top end of an output shaft 31a of an electric motor 31 (described later) for co-rotation with the motor output shaft. The input-side pulley 21 is configured to rotate about the axis L1 of the output shaft 31a. The output-side pulley 22 is provided on the outer periphery of the rack shaft 7 so as to be rotatable relative to the rack shaft. The output-side pulley 22 is configured to rotate about the axis L2 of the rack shaft 7, based on the rotational force of the input-side pulley 21. The ball screw 40 is interposed between the output-side pulley 22 and the rack shaft 7, for reducing rotation of the output-side pulley 22 and for converting the speed-reduced rotation to axial movement of the rack shaft 7. The belt 23 is wound over the input-side pulley 21 and the output-side pulley 22, for transmitting rotation of the input-side pulley 21 to the output-side pulley 22, for synchronous rotation of these two pulleys 21, 22. Transfer mechanism 20 is housed and arranged in a transfer mechanism housing part 14 defined between the joint ends of the two housings 11, 12, fitted together.

As shown in FIG. 2, transfer mechanism 20 also includes a ball bearing 24 and a lock nut 25. The ball bearing 24 is constructed by an outer ring 24a, an inner ring 24b, and a plurality of balls 24c confined between the outer and inner rings 24a-24b. The lock nut 25 is provided for retaining and fixing the outer ring 24a on the inner peripheral wall of the first housing 11.

Ball screw 40 is mainly constructed by a nut 41, a ball recirculation groove 42 having a prescribed lead angle, a plurality of recirculating balls 43, and a tube, exactly, a tubular ball-return guide (not shown) for recirculation of balls 43. The nut 41 is formed into a cylindrical hollow (annular) shape configured to surround the rack shaft 7 and provided to be rotatable relative to the rack shaft 7. The ball recirculation groove 42 is constructed by the spiral shaft-side ball screw groove 42a formed in the outer periphery of rack shaft 7 and a nut-side ball screw groove 42b formed in the inner periphery of nut 41. The plurality of balls 43 are interposed rollably in the ball recirculation groove 42. The tube (the ball-return guide) is configured to connect both ends of the ball recirculation groove 42 for recirculation of balls 43 between both ends of the ball recirculation groove 42.

In this embodiment, the above-mentioned shaft-side ball screw groove 42a is formed (ground) such that a waviness "WAVINESS" (described later), which is a periodic change of a groove radius of the ball screw groove generated after grinding, falls within a prescribed frequency range "200<WAVINESS<1000 (unit: Hz)".

By the way, the "WAVINESS" can be defined by the equation "WAVINESS=L/P". Therefore, on the assumption that w is a rotational speed of the second member 7b during grinding of the shaft-side ball screw groove 42a, g is a rotational speed of a grindstone 51 during grinding of the shaft-side ball screw groove, and p is a circumferential length of one circumference of the shaft-side ball screw groove 42a around the rotation axis, a specified machining condition "g/(5×p)<w<g/p" of the shaft-side ball screw groove 42a can be derived by deforming the inequality of the prescribed frequency range of "WAVINESS" based on the previously-discussed definition of the "WAVINESS". In other words, the "WAVINESS" of the shaft-side ball screw groove 42a can be kept within the prescribed frequency range by grinding the shaft-side ball screw groove 42a under the above-mentioned specified machining condition. Note that the prescribed frequency range of the "WAVINESS" on which the specified machining (grinding) condition is based, is derived from the result of two considerations described hereunder.

(Consideration 1)

The lower limit of the prescribed frequency range, namely, "200<WAVINESS", was considered as follows. As described later, regarding the "WAVINESS" after grinding, a plurality of frequencies are set. In the shown embodiment, as representative examples, two different frequencies, that is, the "WAVINESS" after grinding of 200 Hz and the "WAVINESS" after grinding of 1000 Hz are exemplified. The first consideration has been made by comparing the wavinesses "WAVINESSES" after superfinishing subsequently to the grinding step on the basis of FIG. 3.

Figure 3A:
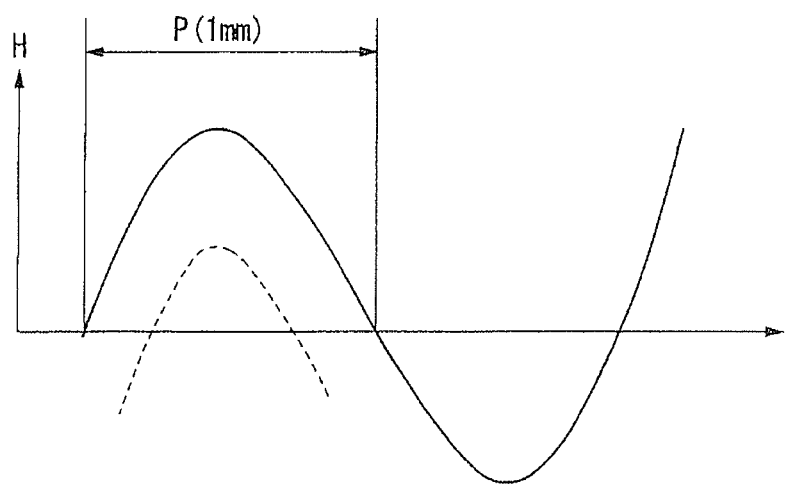
Figure 3B:
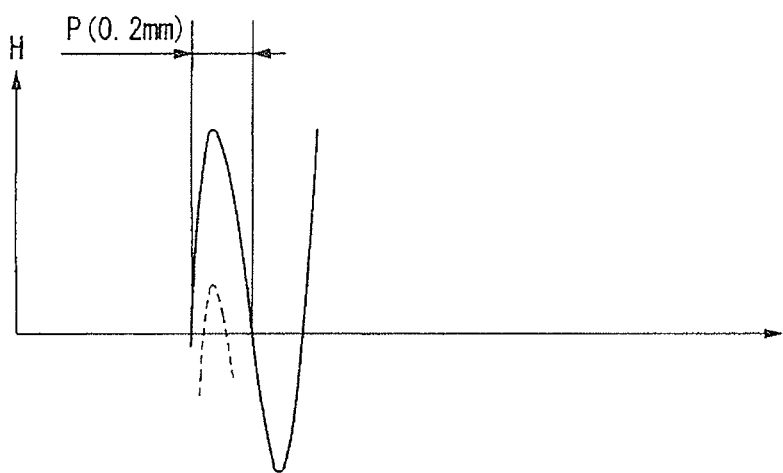
FIG. 3*b* is a diagram illustrating the state of "WAVINESS" of 1000 Hz after grinding and the state of "WAVINESS" after superfinishing.

FIG. 3a shows the state where the "WAVINESS" is set to 200 Hz, whereas FIG. 3b shows the state where the "WAVINESS" is set to 1000 Hz. In each of these diagrams, the solid line indicates a height H of "WAVINESS" (corresponding to one period of waviness) before superfinishing, whereas the broken line indicates a height H of "WAVINESS" (for one period of waviness) after superfinishing. In each of these two cases, a test has been performed by the use of a work (a workpiece) 50 having the same circumferential length L of 200 mm.

As shown in FIG. 3a, in the case of the "WAVINESS" of 200 Hz, a pitch length P (hereinafter referred to as simply "pitch") corresponding to a length of one waviness is 1 mm (comparatively wide). Thus, the "WAVINESS" cannot be sufficiently reduced, even if superfinishing has been performed.

In contrast, as shown in FIG. 3b, in the case of the "WAVINESS" of 1000 Hz, the pitch P is 0.2 mm (comparatively narrow), and thus the "WAVINESS" can be sufficiently reduced by virtue of superfinishing.

Therefore, from the viewpoint of the above-mentioned test results, desirably, the "WAVINESS" can be considered to be greater than at least 200 Hz.

(Consideration 2)

On the other hand, the upper limit of the prescribed frequency range, namely, "WAVINESS<1000", was considered based on the relationship between a reduction rate X (exactly, a reduction rate height H) of the "WAVINESS" in the superfinishing step and the cycle time T.

Figure 4:
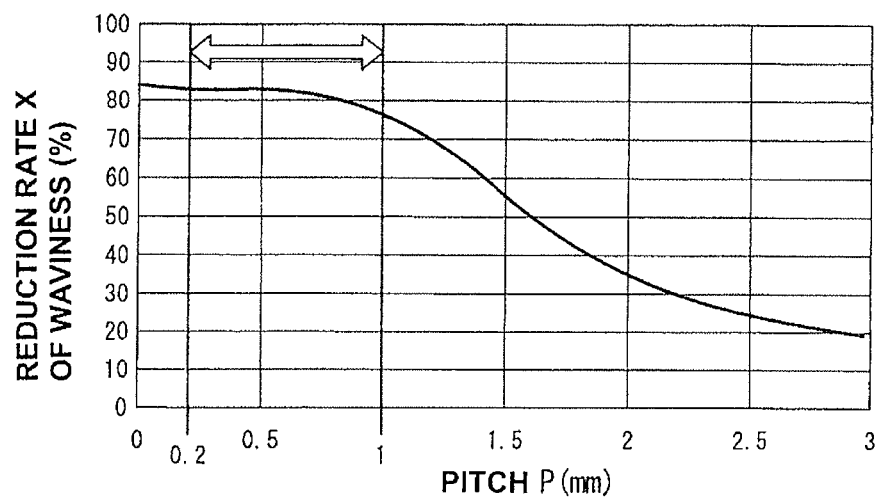
FIG. 4 is a graph illustrating the relationship between a pitch of "WAVINESS" and a reduction rate of "WAVINESS" by virtue of superfinishing.
Figure 5:
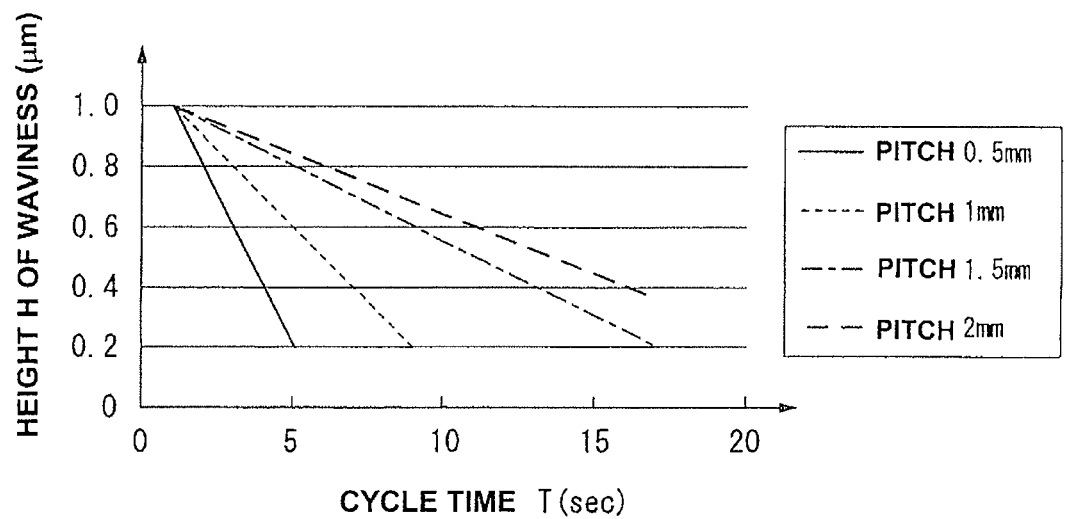
FIG. 5 is a graph illustrating the relationship between each individual pitch of "WAVINESS" and the cycle time for superfinishing.

FIG. 4 shows the relationship between the reduction rate of the "WAVINESS" in the superfinishing step and the pitch P, whereas FIG. 5 shows the relationship between the cycle time T for each individual pitch P and the height H of "WAVINESS".

That is, when the pitch P is set to 1 mm or more, as shown in FIG. 4 it is difficult to sufficiently ensure the reduction rate X of "WAVINESS" in the superfinishing step. Moreover, when the pitch P is set to 1 mm or more, as shown in FIG. 5, the working time (cycle time T) required for reducing the above-mentioned height H to 0.2 μm via the superfinishing step tends to greatly increase. This leads to a decrease in productivity.

On the other hand, when the pitch P is set to 0.2 mm or less, as shown in FIG. 4 the reduction rate X of "WAVINESS" in the superfinishing step is sufficient, but in this range a change in the reduction rate X is hardly observed. Additionally, for the purpose of setting the pitch P to 0.2 mm or less, the work must be rotated more slowly in the grinding step of the shaft-side ball screw groove 42a, and thus the cycle time required for grinding tends to increase. This also leads to a decrease in productivity.

Taking account of the relationship among the reduction rate X of "WAVINESS", the cycle time for grinding the shaft-side ball screw groove 42a, and the cycle time for superfinishing the same, desirably, the "WAVINESS" can be considered to be less than at least 1000 Hz.

Returning to FIG. 2, the previously-discussed motor unit 30 is constructed by the electric motor 31 and an electronic controller 32 integrally connected to each other. One axial end of electric motor 31, at which the output shaft 31a protrudes, is supported by and fixedly connected to the second housing 12. The electric motor 31 is configured to generate a steering assist force (torque), which is applied through the transfer mechanism 20 to the rack shaft 7 by rotationally driving the input-side pulley 21. The electronic controller 32 is attached to the other end of electric motor 31, for drivingly controlling the electric motor 31 depending on predetermined parameters, such as steering torque, vehicle speed and the like.

Figure 6:
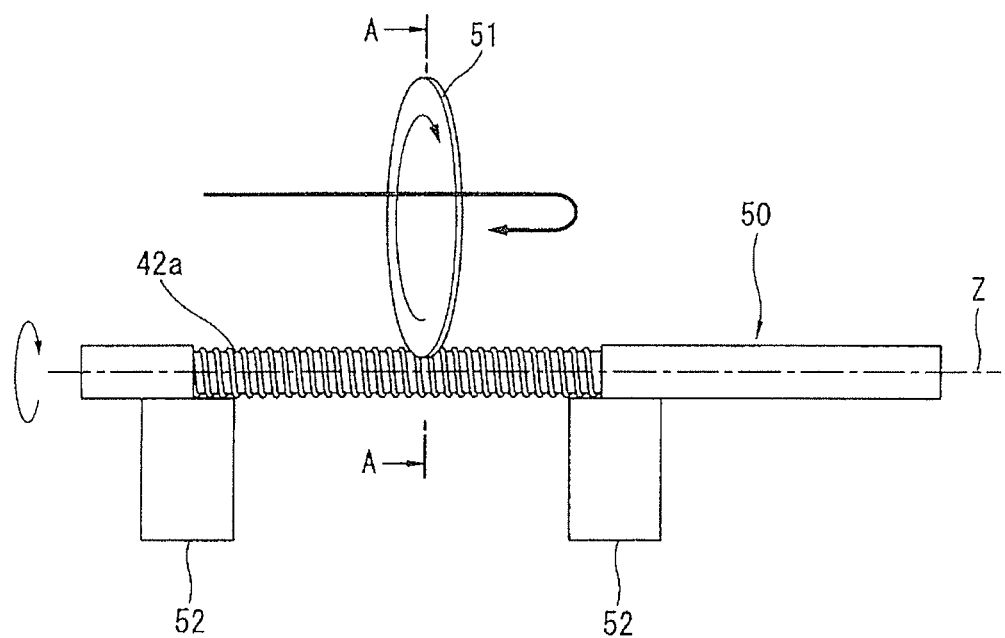
FIG. 6 is a schematic diagram illustrating a method for producing a second member and concerned with a grinding process of the shaft-side ball screw groove.
Figure 7:
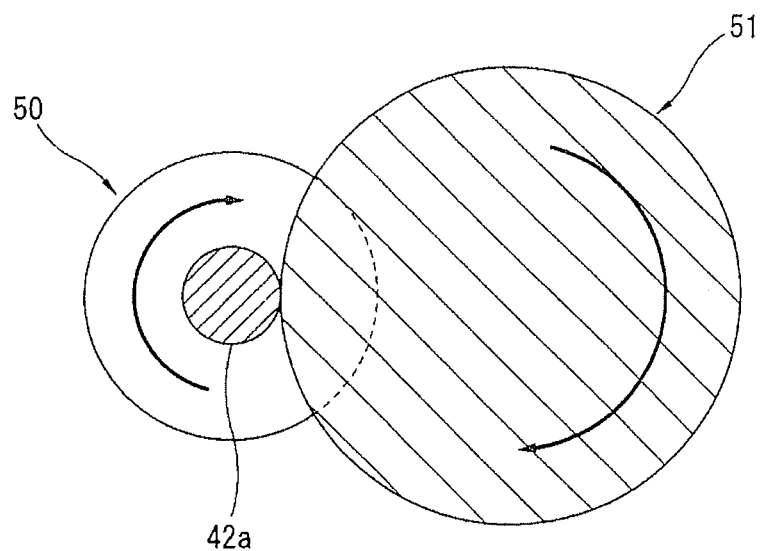
FIG. 7 is a cross-sectional view taken along the line A-A of FIG. 6.
Figure 8:
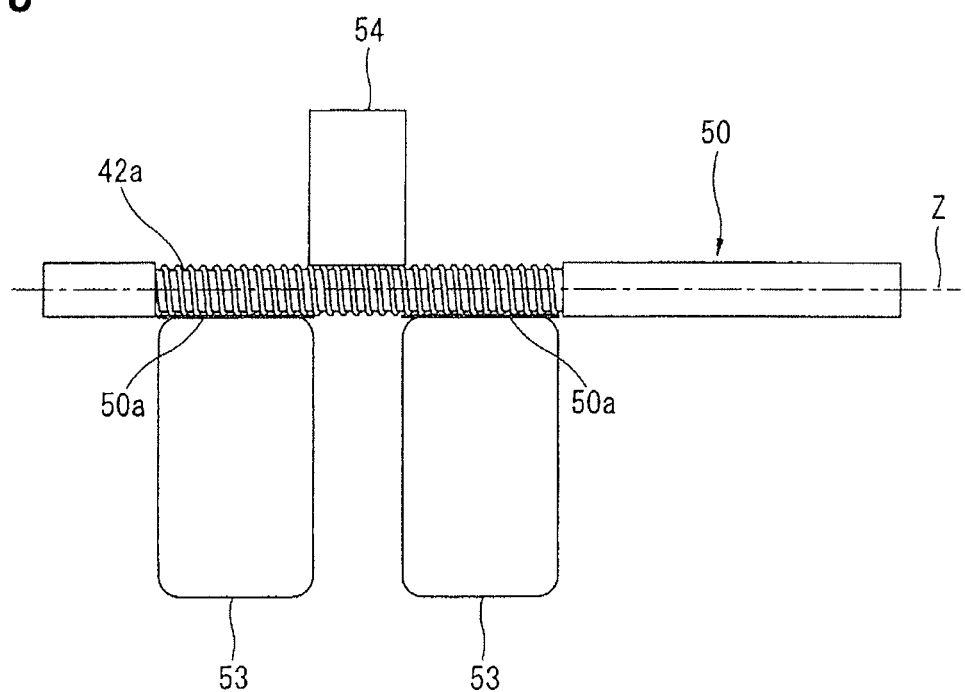
FIG. 8 is a schematic diagram illustrating the method for producing the second member and concerned with a pre-processing before superfinishing.
Figure 9:
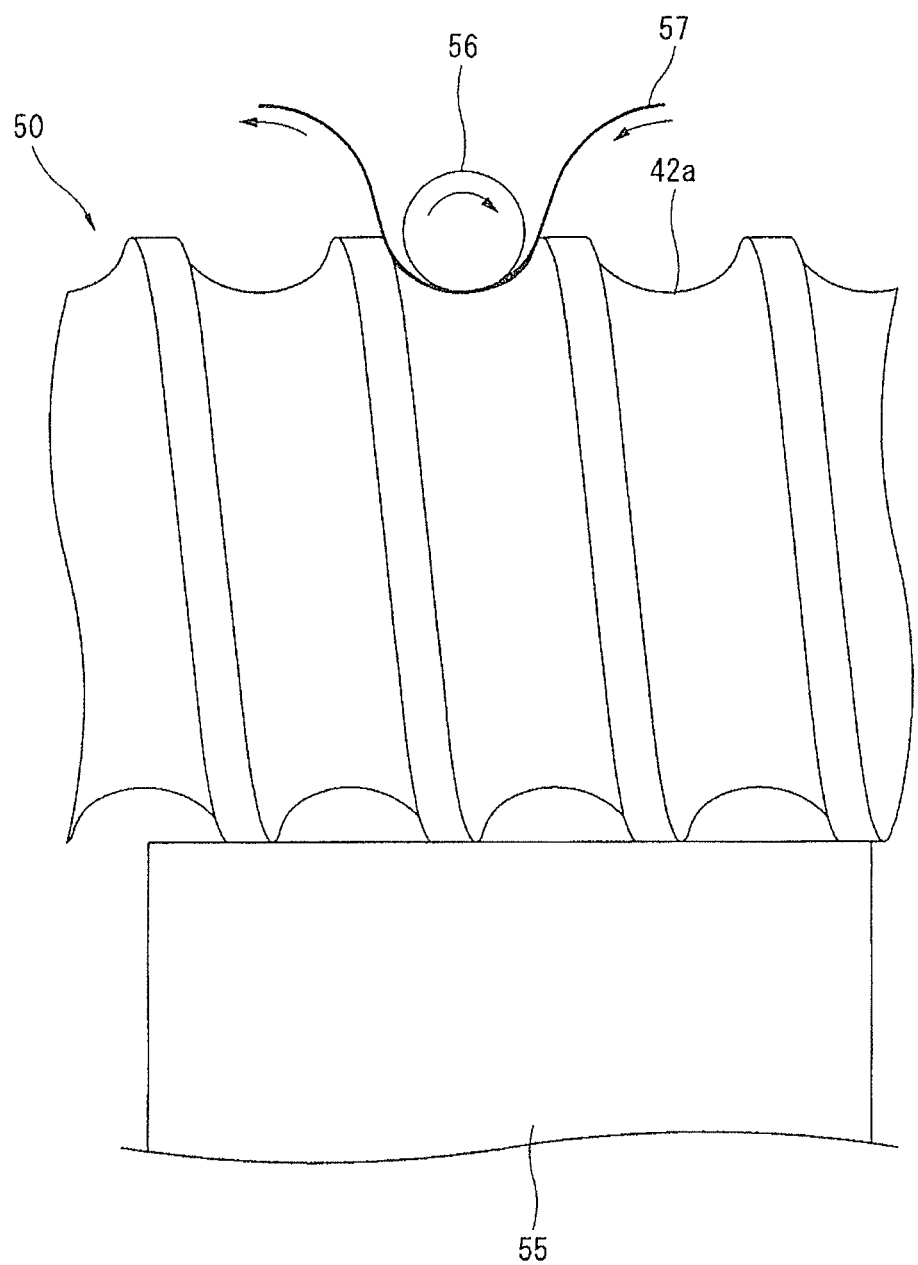
FIG. 9 is a schematic diagram illustrating the method for producing the second member and concerned with a super-finishing process.

A method for producing the rack shaft 7, in particular, a method for producing the second member 7b is hereunder described in detail by reference to FIGS. 6-9. FIG. 6 is the schematic diagram illustrating the grinding process of the shaft-side ball screw groove 42a of the second member 7b. FIG. 7 is the cross-sectional view taken along the line A-A of FIG. 6. FIG. 8 is the schematic diagram illustrating the pre-processing before superfinishing, in a pair of supported areas 50a, 50a of the second member 7b. FIG. 9 is the partially enlarged view illustrating the superfinishing process of the shaft-side ball screw groove 42a of the second member 7b.

First of all, the shaft-side ball screw groove 42a is formed in the outer peripheral surface of work 50 that a metallic material is formed into a round bar shape. Thereafter, as shown in FIG. 6, the work 50, which has been formed with the shaft-side ball screw groove 42a, is caused to rotate about an axis Z as a rotation axis, while supporting a side of work 50, which is opposite to the grindstone 51 (described later), by means of a pair of rests 52, 52 (a first step of the invention). At the same time, the shaft-side ball screw groove 42a is ground, while causing the substantially disk-shaped grindstone 51 to rotate and move along the rotation axis of the work 50 formed with the shaft-side ball screw groove 42a, the work serving as a ball screw shaft (a second step of the invention). In this case, as shown in FIG. 7, the work 50 and the grindstone 51 are caused to rotate in the same direction, while keeping the rotational speed of the grindstone 51 constant.

Furthermore, it is preferable to perform the previously-discussed grinding a plurality of times such that, as indicated by the bold arrow in FIG. 6, the shaft-side ball screw groove 42a is ground from one end to the other end, and then reciprocatingly reground, returning from the other end back to the one end.

Subsequently to the above, as shown in FIG. 8, the pre-processing before superfinishing is performed for a pair of predetermined axial areas (hereinafter referred to as "supported areas") 50a, 50a provided on the outer peripheral surface of the work 50 whose ball screw groove 42a has been ground and supported by means of a pair of rests 55, 55 in the superfinishing step (described later) of the shaft-side ball screw groove 42a.

By performing the previously-noted pre-processing before superfinishing, the roundness of the work 50 can be improved. Thus, the support position accuracy of the work 50, which is supported by means of rests 55, 55 used in the superfinishing step (described later) of the shaft-side ball screw groove 42a, can be improved. As a result of this, it is possible to realize good superfinishing for the shaft-side ball screw groove 42a, and hence it is possible to more effectively remove, eliminate or reduce the "WAVINESS".

Moreover, at this time, the pre-processing before superfinishing is performed, while supporting a first side of a specified area of the work 50 set between both of the supported areas 50a, 50a by means of a rest 54, the first side being opposite to a second side of the work onto which grindstones 53 are brought during the pre-processing. This enables stable pre-processing before superfinishing with respect to both of the supported areas 50a, 50a, and thus it is possible to further improve the roundness of both of the supported areas 50a, 50a.

After this, a superfinishing process, that is, a generally-known film lapping process, is performed for the shaft-side ball screw groove 42a. Concretely, as shown in FIG. 9, a polishing film 57 is interposed between the shaft-side ball screw groove 42a of the work 50 and a roller 56 arranged so as to face the ball screw groove, while supporting the previously-discussed supported areas 50a, 50a by means of respective rests 55, 55. The superfinishing process is performed by sending the polishing film 57 from one end of the shaft-side ball screw groove 42a to the other end (from right to left, viewing FIG. 9 in the shown embodiment), while rotating the roller 56.

As discussed above, according to a method for producing a threaded shaft for power steering device, and a power steering device of the embodiment, it is possible to suppress the extension of cycle time required for grinding the shaft-side ball screw groove 42a, while ensuring a good surface accuracy of the shaft-side ball screw groove 42a, by grinding the shaft-side ball screw groove 42a so as to satisfy the previously-noted specified machining condition "g/(5×p) <w<g/p".

That is, satisfying the inequality "w<g/p" enables a sufficient reduction in the "WAVINESS" by superfinishing after the shaft-side ball screw groove 42a has been ground, and thus it is possible to obtain the shaft-side ball screw groove 42a having a good surface accuracy.

Additionally, satisfying the inequality "g/(5×p)<w" eliminates the necessity of reducing the rotational speed of the work 50 more than needed during grinding of the shaft-side ball screw groove 42a. As a result, it is possible to suppress the disadvantage that the cycle time required for grinding the shaft-side ball screw groove 42a will be extended more than needed.

Additionally, even if the pitch P of the "WAVINESS" of the shaft-side ball screw groove 42a is set to 0.2 mm or less, the improvement margin of the surface accuracy obtained by superfinishing is comparatively small. For this reason, by setting the pitch P to 0.2 mm or more, it is possible to suppress the cycle time required for grinding the shaft-side ball screw groove 42a from being extended unnecessarily, while performing the superfinishing process within the specified frequency range, in which the reduction effect of the "WAVINESS" is remarkable.

Furthermore, in the first step and the second step, the grinding process for the shaft-side ball screw groove 42a is performed a plurality of times. Hence, it is possible to obtain the surface accuracy that cannot be achieved with only one grinding process. This contributes to the further improved surface accuracy of the shaft-side ball screw groove 42a.

Additionally, in grinding a plurality of times, the grinding process is performed, while changing the direction of travel of the grinding process, such that the shaft-side ball screw groove 42a is ground from one end to the other end, and then reground, returning from the other end back to the one end. Hence, it is possible to remove irregularities that cannot be removed by the grinding process in only one direction of travel. This enables the formation of a smoother rolling surface of the shaft-side ball screw groove 42a.

Also, in the first step and the second step, these steps are performed, while keeping the rotational speed of the grindstone 51 for grinding the shaft-side ball screw groove 42a constant. Hence, it is possible to improve the uniformity of the rolling surface of the shaft-side ball screw groove 42a.

Moreover, in the first step and the second step, the grinding process of the shaft-side ball screw groove 42a is performed, while causing the grindstone 51 and the second member 7b to rotate in the same direction. Hence, input from the grindstone 51 can be appropriately transmitted to the work 50. This also enables the formation of a smoother rolling surface of the shaft-side ball screw groove 42a.

Conversely assuming that the grindstone 51 and the second member 7b are rotated in opposite directions to each other, the work 50 rotates in the direction that the work escapes with respect to rotation of the grindstone 51. This leads to a reduction in the input from the grindstone 51, thereby causing an increase in the "WAVINESS".

While the foregoing is a description of the preferred embodiments carried out the invention, it will be understood that the invention is not limited to the particular embodiments shown and described herein, but that various changes and modifications may be made without departing from the scope or spirit of this invention. For instance, various changes and modifications may be made depending on the specification of a power steering device to which the invention is applied.

As a method for producing a threaded shaft for power steering device, and a power steering device, based on the embodiments shown and described herein, aspects mentioned below can be taken into account.

That is to say, according to one aspect of a method for producing a threaded shaft for power steering device, the method for producing the threaded shaft for use with a power steering device equipped with a ball screw shaft, which is a shaft member having a substantially circular cross-section and provided to steer steered road wheels in accordance with rotation of a steering wheel, the ball screw shaft having a spiral shaft-side ball screw groove formed in an outer peripheral surface in a predetermined axial range, a nut formed into an annular shape configured to surround the ball screw shaft and having a nut-side ball screw groove formed in an inner peripheral surface for constituting a spiral ball recirculation groove in conjunction with the shaft-side ball screw groove, the nut provided to be rotatable relative to the ball screw shaft, a plurality of balls interposed rollably in the ball recirculation groove, and an electric motor configured to apply a steering assist force to the ball screw shaft by rotationally driving the nut and converting rotation of the nut to axial movement of the ball screw shaft, and the method for producing the threaded shaft being a method for producing the ball screw shaft formed such that a groove radius, which is a distance from the rotation axis to the shaft-side ball screw groove, periodically changes in a circumferential direction of the rotation axis, the method comprises a first step of causing the ball screw shaft to rotate about the axis of the ball screw shaft as the rotation axis, and a second step of grinding the ball screw shaft by causing a grindstone to rotate and move along the rotation axis of the ball screw shaft while performing the first step, the first step and the second step being performed so as to satisfy an expression $g/(5 \times p) < w < g/p$, where w is a rotational speed of the ball screw shaft during grinding of the shaft-side ball screw groove, g is a rotational speed of the grindstone during grinding of the shaft-side ball screw groove, and p is a circumferential length of one circumference of the shaft-side ball screw groove around the rotation axis.

According to a preferable aspect of the method for producing the threaded shaft for power steering device, a length of one pitch of a periodic change in the groove radius of the shaft-side ball screw groove is 0.2 mm or more.

According to another preferable aspect, in any one of the preceding aspects of the method for producing the threaded shaft for power steering device, the first step and the second step include a step of grinding the shaft-side ball screw groove a plurality of times.

According to a further preferable aspect, in any one of the preceding aspects of the method for producing the threaded shaft for power steering device, the first step and the second step include a step of grinding the shaft-side ball screw groove from one end to the other end, and then regrinding the shaft-side ball screw groove from the other end to the one end.

According to a still further preferable aspect, in any one of the preceding aspects of the method for producing the threaded shaft for power steering device, the first step and the second step are performed, while keeping the rotational speed g of the grindstone constant during grinding of the shaft-side ball screw groove.

According to another preferable aspect, in any one of the preceding aspects of the method for producing the threaded shaft for power steering device, the first step and the second step are performed, while causing the grindstone and the ball screw shaft to rotate in a same direction.

According to another aspect, a power steering device comprises a ball screw shaft, which is a shaft member having a substantially circular cross-section and provided to steer steered road wheels in accordance with rotation of a steering wheel, the ball screw shaft having a spiral shaft-side ball screw groove formed in an outer peripheral surface in a predetermined axial range, a nut formed into an annular shape configured to surround the ball screw shaft and having a nut-side ball screw groove formed in an inner peripheral surface for constituting a spiral ball recirculation groove in conjunction with the shaft-side ball screw groove, the nut provided to be rotatable relative to the ball screw shaft, a plurality of balls interposed rollably in the ball recirculation groove, and an electric motor configured to apply a steering assist force to the ball screw shaft by rotationally driving the nut and converting rotation of the nut to axial movement of the ball screw shaft, wherein the shaft-side ball screw groove is formed by grinding the ball screw shaft, while causing the grindstone to rotate and move along the rotation axis of the ball screw shaft under a state where the ball screw shaft is caused to rotate about an axis of the ball screw shaft as the rotation axis such that a groove radius, which is a distance from the rotation axis to the shaft-side ball screw groove, periodically changes in a circumferential direction of the rotation axis, and wherein the shaft-side ball screw groove is formed so as to satisfy an expression $g/(5 \times p) < w < g/p$, where w is a rotational speed of the ball screw shaft during grinding of the shaft-side ball screw groove, g is a rotational speed of the grindstone during grinding of the shaft-side ball screw groove, and p is a circumferential length of one circumference of the shaft-side ball screw groove around the rotation axis.

According to a preferable aspect of the power steering device, a length of one pitch of a periodic change in the groove radius of the shaft-side ball screw groove is 0.2 mm or more.

According a further preferable aspect, in any one of the preceding aspects of the power steering device, the shaft-side ball screw groove is formed by grinding the shaft-side ball screw groove a plurality of times.

According to a still further preferable aspect, in any one of the preceding aspects of the power steering device, the shaft-side ball screw groove is formed by grinding the shaft-side ball screw groove from one end to the other end, and then regrinding the shaft-side ball screw groove from the other end to the one end.

The invention claimed is:

1. A method for producing a threaded shaft for power steering device, the method for producing the threaded shaft for use with a power steering device equipped with:
    a ball screw shaft, which is a shaft member having a substantially circular cross-section and provided to steer steered road wheels in accordance with rotation of a steering wheel, the ball screw shaft having a spiral shaft-side ball screw groove formed in an outer peripheral surface in a predetermined axial range;
    a nut formed into an annular shape configured to surround the ball screw shaft and having a nut-side ball screw groove formed in an inner peripheral surface for constituting a spiral ball recirculation groove in conjunction with the shaft-side ball screw groove, the nut provided to be rotatable relative to the ball screw shaft;
    a plurality of balls interposed rollably in the ball recirculation groove; and
    an electric motor configured to apply a steering assist force to the ball screw shaft by rotationally driving the nut and converting rotation of the nut to axial movement of the ball screw shaft, and
    the method for producing the threaded shaft being a method for producing the ball screw shaft formed such that a groove radius, which is a distance from a rotation axis of the ball screw shaft corresponding to an axis of the ball screw shaft to the shaft-side ball screw groove, periodically changes in a circumferential direction of the rotation axis, the method comprising:
    a first step of causing the ball screw shaft to rotate about the axis of the ball screw shaft as the rotation axis; and
    a second step of grinding the ball screw shaft by causing a grindstone to rotate and move along the rotation axis of the ball screw shaft while performing the first step,
    wherein the first step and the second step are performed so as to satisfy an expression $g/(5 \times p) < w < g/p$, where w is a rotational speed of the ball screw shaft during grinding of the shaft-side ball screw groove, g is a rotational speed of the grindstone during grinding of the shaft-side ball screw groove, and p is a circumferential length of one circumference of the shaft-side ball screw groove around the rotation axis.

2. A method for producing a threaded shaft for power steering device as recited in claim 1, wherein:

a length of one pitch of a periodic change in the groove radius of the shaft-side ball screw groove is 0.2 mm or more.

3. A method for producing a threaded shaft for power steering device as recited in claim 1, wherein:
the first step and the second step include a step of grinding the shaft-side ball screw groove a plurality of times.

4. A method for producing a threaded shaft for power steering device as recited in claim 3, wherein:
the first step and the second step include a step of grinding the shaft-side ball screw groove from one end to the other end, and then regrinding the shaft-side ball screw groove from the other end to the one end.

5. A method for producing a threaded shaft for power steering device as recited in claim 1, wherein:
the first step and the second step are performed, while keeping the rotational speed g of the grindstone constant during grinding of the shaft-side ball screw groove.

6. A method for producing a threaded shaft for power steering device as recited in claim 1, wherein:
the first step and the second step are performed, while causing the grindstone and the ball screw shaft to rotate in a same direction.

* * * * *